E. N. MAULL.
MACHINE FOR WASHING FRUIT.
APPLICATION FILED NOV. 7, 1913.

1,100,981.

Patented June 23, 1914.
4 SHEETS—SHEET 3.

Witnesses
Dudley Browne
W. A. Williams

Inventor
Edward N. Maull.
By Reonard Phelps
Attorneys

E. N. MAULL.
MACHINE FOR WASHING FRUIT.
APPLICATION FILED NOV. 7, 1913.

1,100,981.

Patented June 23, 1914.
4 SHEETS—SHEET 4.

Witnesses
Dudley Brown
W. A. Williams

Inventor
Edward N. Maull
By Brown & Phelps
Attorneys

UNITED STATES PATENT OFFICE.

EDWARD N. MAULL, OF JACKSONVILLE, FLORIDA, ASSIGNOR TO J. P. CAMPBELL, OF JACKSONVILLE, FLORIDA.

MACHINE FOR WASHING FRUIT.

1,100,981.  Specification of Letters Patent.  Patented June 23, 1914.

Application filed November 7, 1913. Serial No. 799,685.

*To all whom it may concern:*

Be it known that I, EDWARD N. MAULL, a citizen of the United States, residing at Jacksonville, in the county of Duval and State of Florida, have invented certain new and useful Improvements in Machines for Washing Fruit, of which the following is a specification.

My invention relates to certain new and useful improvements in machines for washing fruit, and one object of my invention is to provide a machine of this character which will handle the fruit without injury, thoroughly wash and scrub all parts of the fruit and feed the same through the machine automatically and expeditiously.

A further object is to provide a machine in which the fruit is continuously washed with fresh clean water, thereby insuring the carrying off of all dirt and other matter washed from the fruit.

A still further object of my invention is to provide a machine of this character which is simple in construction, highly efficient in operation, not likely to get out of order, and cheap to operate.

With the foregoing and other objects in view my invention consists in certain constructions, combinations and arrangements of parts, the preferred form of which will be first described in connection with the accompanying drawings and then the invention more particularly pointed out in the appended claims.

Figure 1:
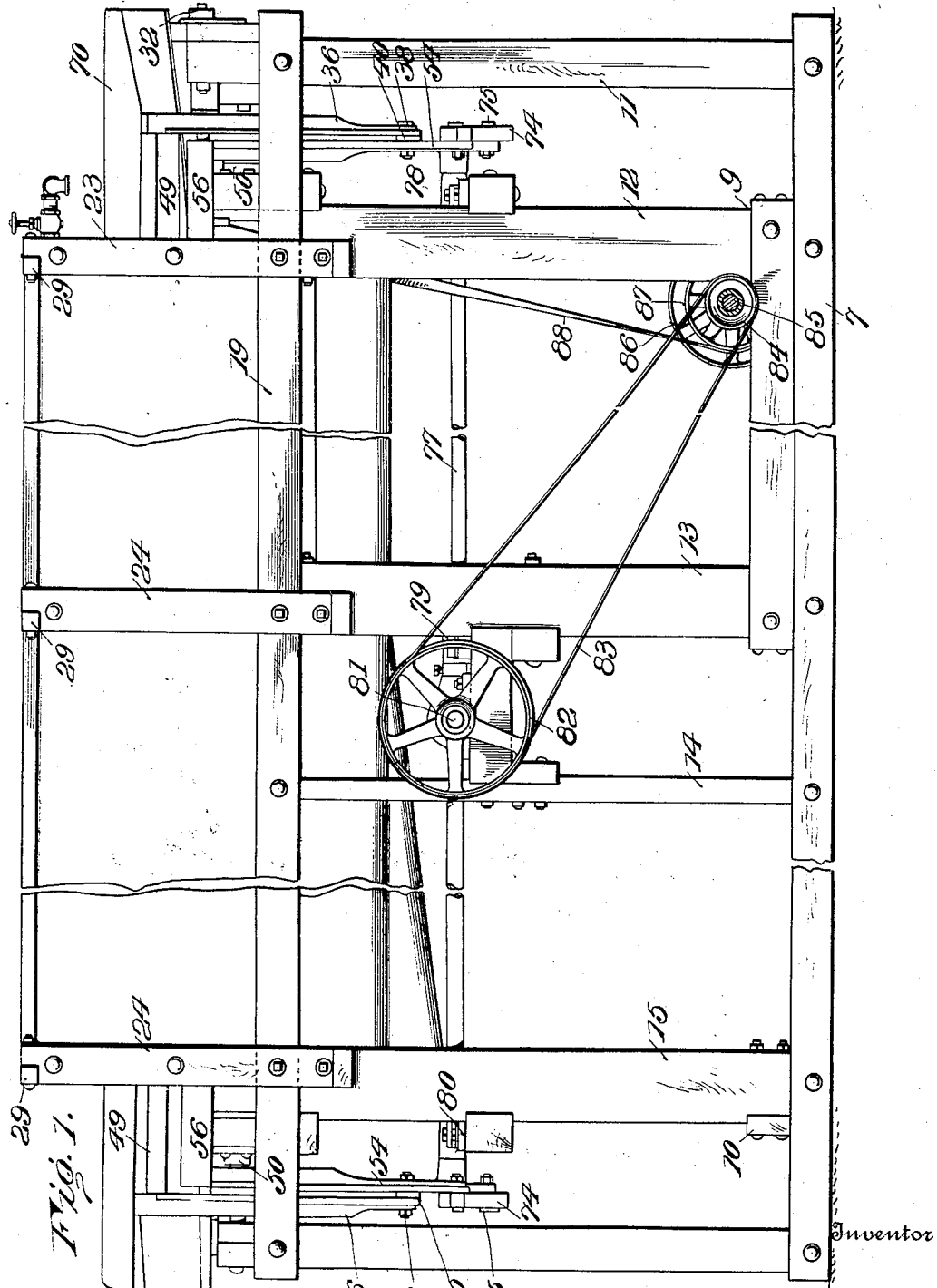
Figure 2:
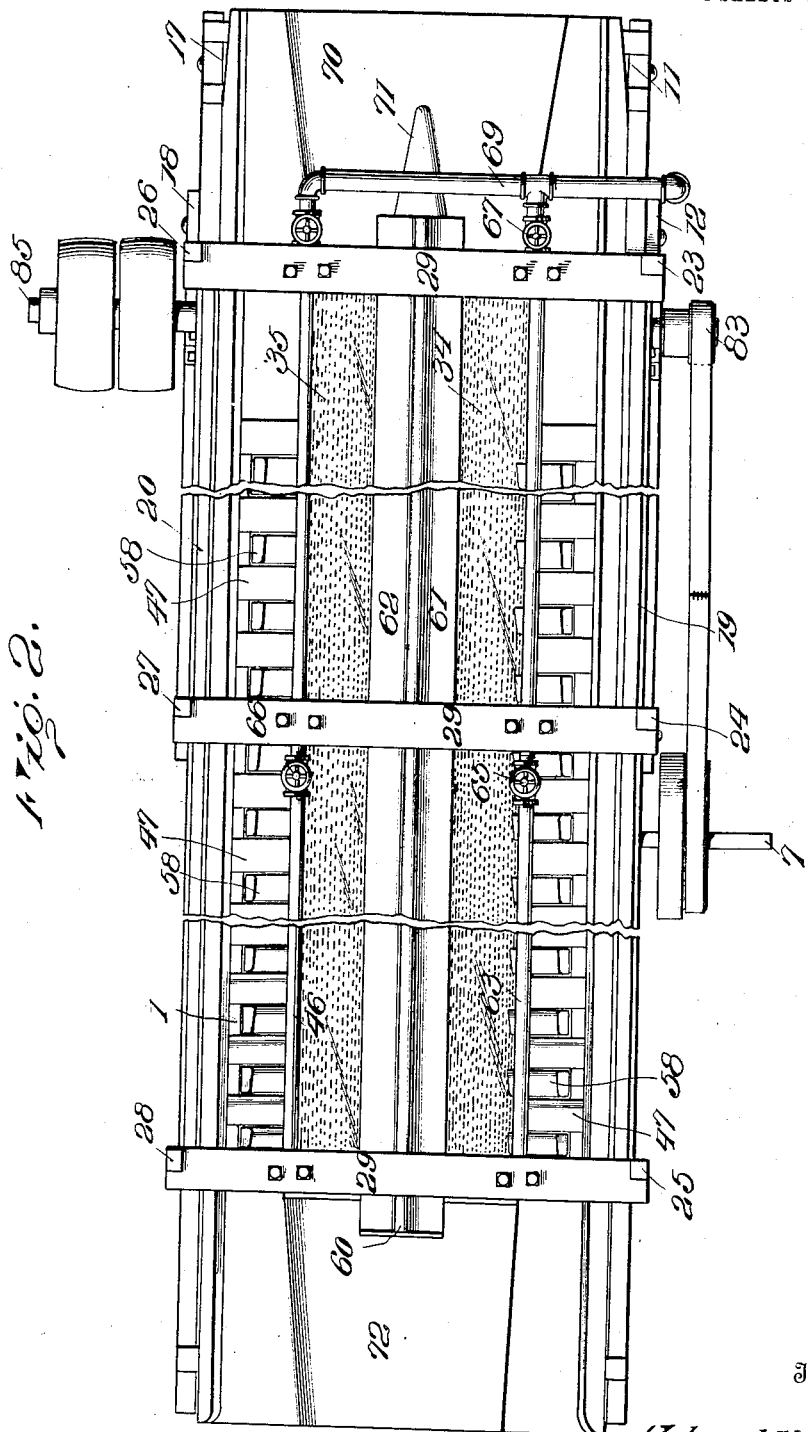
Figure 3:
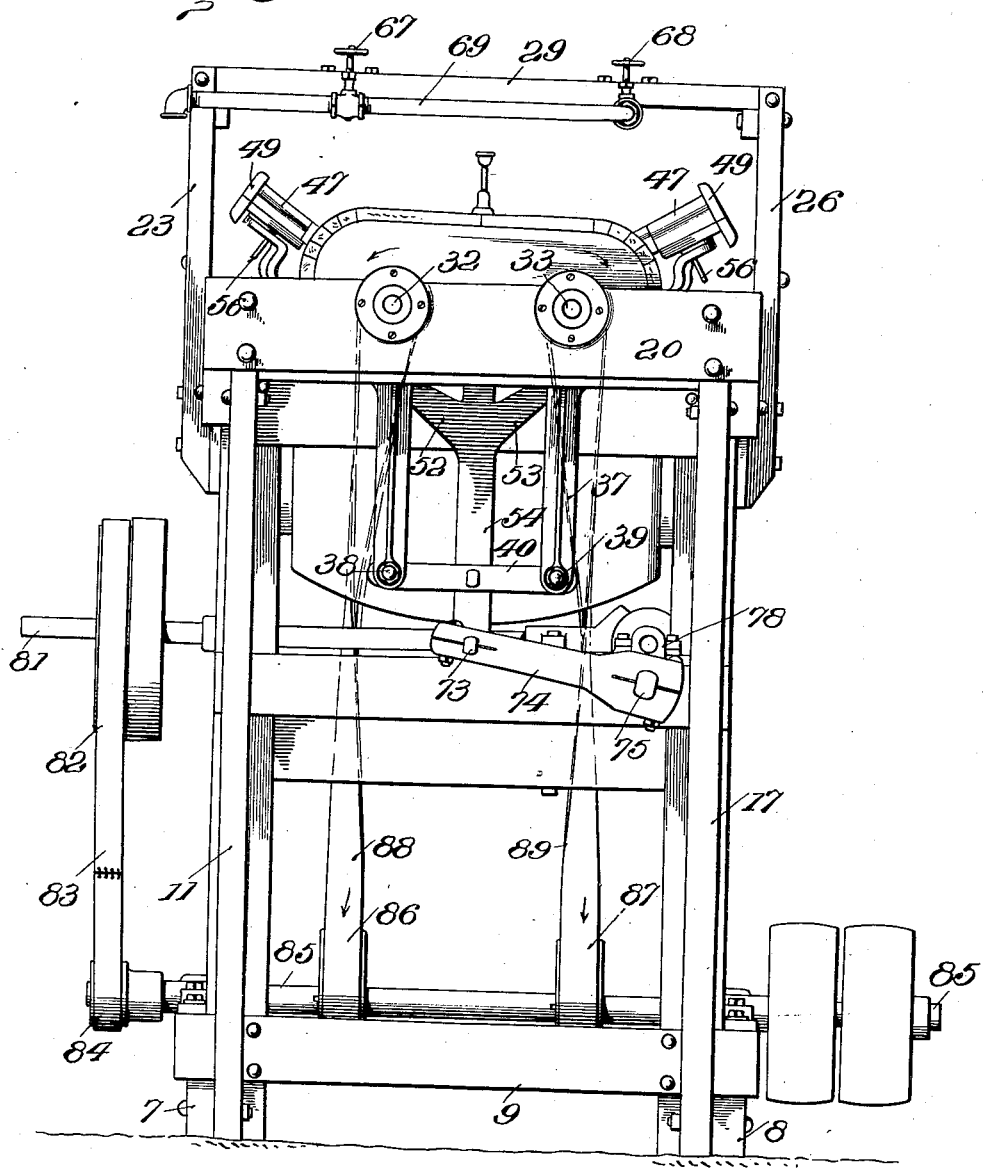
Figure 4:
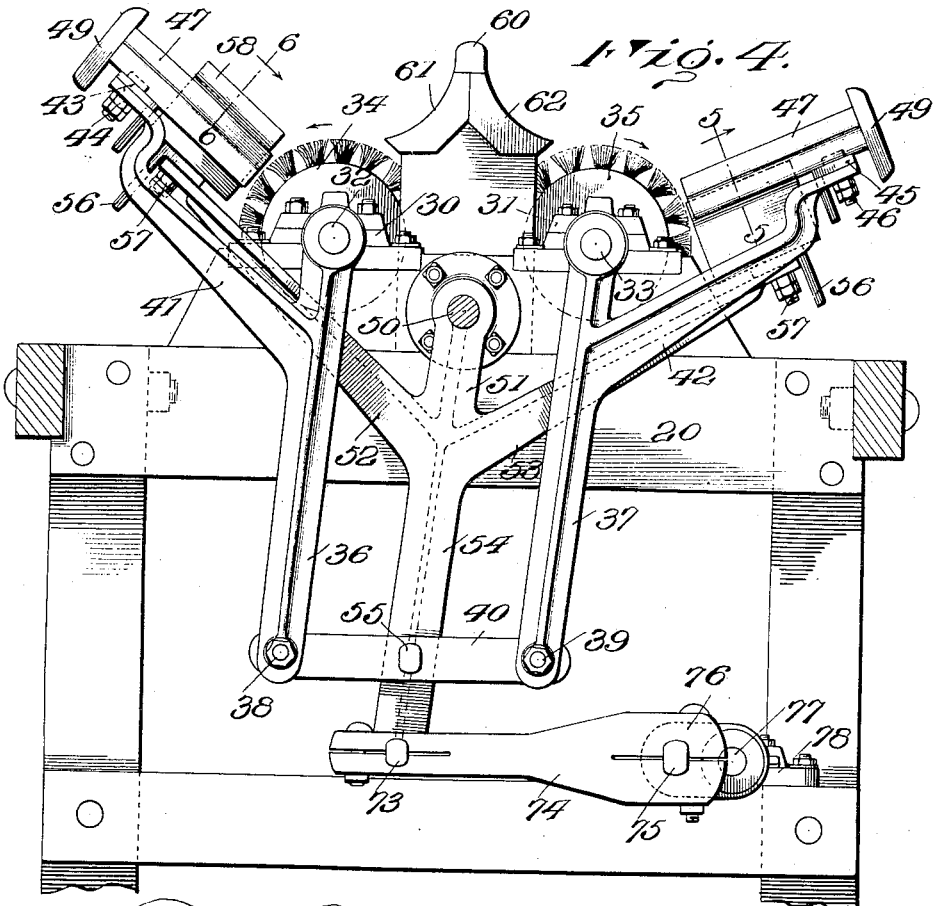
Figure 5:
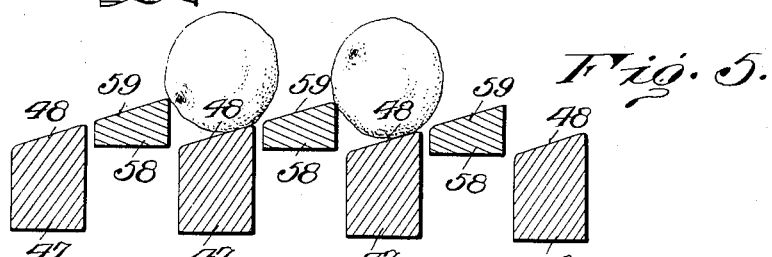
Figure 6:
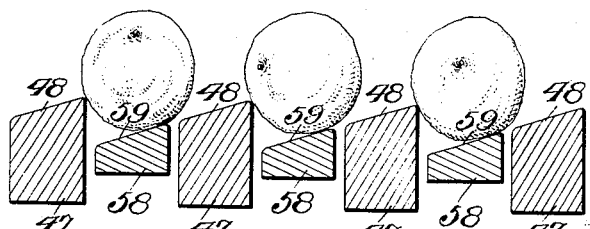

Referring to the drawings wherein the same part is designated by the same reference numeral wherever it occurs, Figure 1 is a side elevation of a machine embodying my invention; Fig. 2 is a top plan view of the construction shown in Fig. 1; Fig. 3 is an end elevation; Fig. 4 is a transverse section showing the brush operating mechanism; Fig. 5 is a section taken on line 5—5 of Fig. 4; and Fig. 6 is a section taken on line 6—6 of Fig. 4.

The numerals 7 and 8 designate base bars forming a support for the machine and carrying lateral members 9 and 10, forming a rectangular framework. Supported by this framework are a plurality of uprights 11, 12, 13, 14, 15, 16 upon the base bar 7, and corresponding uprights upon the base bar 8, only two of such uprights (17, 18) being shown in the drawings. Carried by the uprights on both sides of the machine are longitudinal members 19, 20 having end beams 21 and 22 forming a similar rectangular framework to the one formed by the base bars 7 and 8 and the cross beams 9, 10. The uprights 12, 13 and 15 and the correspondingly opposite uprights carry extensions 23, 24, 25, 26, 27 and 28 respectively, which are bolted thereto. The opposite extensions are connected by means of lateral bars 29 extending across the top of the machine.

Mounted upon the end beams 20 and 21 are bearing blocks 30 and 31 having journaled therein shafts 32 and 33 carrying suitable rotatable fruit washing brushes 34 and 35 extending the entire length of the upper rectangular framework. The shafts 32 and 33 extend out a short distance from the bearings 30 and 31 for a purpose hereinafter explained.

The mechanism for operating the conveyer for feeding the fruit to the washer brushes is the same at both ends of the machine, so that the following description of the said mechanism located at the receiving end of the device will serve for both: Loosely journaled upon the extending portions of the brush shafts 32 and 33 are downwardly extending members 36 and 37 pivotally secured at 38 and 39 to a connecting bar 40. The members 36 and 37 carry angularly disposed extensions 41 and 42 respectively. Connecting the extensions 41 and 41 on both ends of the machine is a longitudinal angle iron rod 43 bolted to the extension by means of bolts 44. Similarly the extensions 42 and 42 are connected by a rod 4 secured at 46. Secured to the rod 43 are a plurality of blocks 47 having upper inclined faces 48 thereon. The rod 45 is similarly provided with blocks 47. At the rear of the blocks 48 and extending the entire length of the series of blocks is a plate 49 to give rigidity to the apparatus and to prevent the fruit placed upon the blocks from falling off on the outside of the carrier.

Carried by the cross beam 20 is a stub shaft 50 having journaled thereon a member 51 having Y arms 52 and 53 extending therefrom. The member 51 has a further vertical extension 54 pivotally connected to the bar 40 by a pin 55 and extending below said bar.

The arms 52 on each end of the machine are connected by means of an angle iron bar 56 secured to the arms by bolts 57. These angle iron members 56 carry blocks 58 smaller than the blocks 47, and extend upwardly between the blocks 47 as shown in Figs. 5 and 6, thus forming a series of alternate large and small, long and short blocks. The blocks 58 are formed with angled faces 59 inclined in the same direction as the faces 49 of the block 48. The blocks 47 are longer than the blocks 58 and the inner edges of both series of blocks are placed in the same plane nearly touching the brushes 34 and 35.

Between the brushes 34 and 35 is a division plate 60 having curved sides 61 and 62 curving downwardly toward the brushes.

Supported by the members 28 are perforated pipes 63 and 64 carrying suitable control valves 65, 66, 67, 68, and connected to a manifold 69 in communication with an outside source of water supply. The purpose of these pipes is to spray water downwardly upon the brushes 34 and 35 and the fruit on the conveyers.

At the receiving end of the machine is a trough 70 downwardly inclined and divided by a division plate 71 which guides the fruit to both sides of the machine. After the fruit has passed through the machine it is deposited upon a shelf or tray 72.

The power is applied to the fruit feeding mechanism in the following manner: The member 55 extends downwardly below the bar 40 and is provided with a pivot pin 73 adapted to engage a crank arm 74 which is in turn pivotally engaged by a pin 75 carried by an eccentric 76 of a shaft 77 suitably journaled in bearings 78, 79 and 80 and connecting the members 54 upon both ends of the machine. The shaft 77 is driven by means of suitable gears by a shaft 81 carrying a pulley wheel 82 driven by a belt 83 carried by a pulley wheel 84 upon a shaft 85, which is driven in any suitable manner and which carries pulley wheels 86 and 87 having drive belts 88 and 89 which rotate the brushes 34 and 35 in a direction toward the outside of the machine.

The operation of the device is as follows: The fruit to be washed is placed on the inclined trough 70 where it rolls by gravity until in contact with the brushes 34 and 35 which are rapidly rotating in a direction which tends to throw the fruit toward the outside of the machine where the fruit falls upon the blocks 47 where it is fed along the machine by the conveyers in the following manner: The rotation of the shaft 77 causes a rapid reciprocation of the crank arm 74 which in turn oscillates the vertical member 54 which rocks upon its pivot 50, thus causing an alternate raising and lowering of the arms 52 and 53 which carry the rods 56, 56 having thereon the blocks 58 which are thus alternately raised and lowered by the oscillation of the member 54. The members 36 and 37 which are pivotally connected to the bar 40 are also oscillated in unison and by the member 54 by means of the pin 55. The members 36 and 37 oscillate upon their pivots 32 and 33 and thereby cause an alternate raising and lowering of the blocks 47 carried by the bars 43 and 45. Due to the location of the pivots 32 and 33 at a point above the pivot 50 of the member 54, and also due to the difference in length of the arms 36 and 37 driven by the bar 40 the member 54 oscillates through a larger arc than the arms 36 and 37, which action causes the smaller blocks 58 to be oscillated higher and lower than the larger blocks 48, in the same period of time. The fruit falls upon the blocks at the feed end of the machine when pushed outwardly by the brushes 34 and 35 and lodges upon the inclined faces 48 of the larger blocks 47. The faces of the blocks 47 and 58 are inclined toward the discharge end of the apparatus. Upon an upward stroke of the blocks 58 the fruit is lifted off the blocks 47 and carried by the blocks 58, as shown in Fig. 5. The blocks 47 now reciprocate and the blocks 58 complete a descending stroke, and as these blocks pass by each other on the up stroke the incline causes the fruit to roll on to a succeeding block and so on. This rolling from one block to the other causes the fruit to present different surfaces to the rotary brushes which thus effectually scrub it all over.

The entire apparatus is covered by a sheet metal hood, and has a drip pan below the washer brushes to carry off the waste water.

Considerable variation of the details of this invention may be resorted to without departing from the spirit thereof, and it is not my intention to confine myself to the specific form shown herein, but to construe the appended claims as broadly as permissible in view of the prior art.

Having thus described my invention what I claim as new and desire to secure by Letters Patent is:

1. In a fruit washer, the combination with a supporting framework, of a brush mounted thereon, means for holding the fruit to be cleaned, and means for positively causing a step-by-step feed of the fruit with respect to said brush.

2. In a fruit washing machine, the combination with a brush, of a feed trough associated therewith, fruit holding means adjacent the periphery of said brush, and means for conveying the fruit along said holding means.

3. In a fruit washing machine, the combination with a relatively long rotary brush, of an inclined feed trough communicating therewith near one end, fruit holding means adjacent the periphery of said brush, means for positively conveying the fruit along said holding means, and means for receiving the fruit from said conveyer.

4. In a fruit washing machine, the combination with a rotary brush, of transversely inclined fruit holding means adjacent the periphery of said brush, vertically movable means for conveying the fruit along said holding means, means for receiving the fruit from said conveying means, and means for preventing the fruit from being forced laterally off of said conveying and holding means.

5. In a fruit washing machine the combination with a plurality of brushes, said brushes being parallel and spaced apart, of a common delivery means thereto, vertically movable fruit conveying means adjacent the periphery of each of said brushes, and means intermediate said brushes adapted to prevent fruit from falling therebetween.

6. In a fruit washing machine the combination with a plurality of brushes, said brushes being parallel and spaced apart, of fruit conveying means adjacent the periphery of said brushes, means intermediate said brushes adapted to prevent fruit from falling between said brushes, said means comprising an upright between said brushes, a hood on said upright, said hood having curved faces adapted to feed said fruit back upon said brushes.

7. In a fruit washing machine the combination with a plurality of brushes, said brushes being parallel and spaced apart, of fruit conveying means adjacent the periphery of said brushes, means intermediate said brushes adapted to prevent fruit from falling between said brushes, said means comprising an upright between said brushes, a hood on said upright, said hood having curved faces adapted to feed said fruit back upon said brushes, and means for supplying water to said brushes thereby to scrub the fruit and clean the same.

8. In a fruit washer, the combination with a supporting framework, of a brush mounted thereon, means forming with said brush a trough for holding the fruit to be cleaned, and means for positively causing a step-by-step feed of the fruit in said trough with respect to said brush.

9. In a fruit washer the combination with a rotary brush, of means for feeding fruit past said brush in a step-by-step movement, said means comprising a plurality of comparatively long blocks spaced apart, and having inclined faces thereon, a plurality of shorter blocks within the spaces formed between said long blocks, and having similarly inclined faces thereon, and means for operating said blocks to cause said fruit to feed along the same.

10. In a fruit washer the combination with a rotary brush, of means for feeding fruit past said brush in a step-by-step movement, said means comprising a plurality of blocks spaced apart, and having inclined faces thereon, means connected with alternate blocks for operating said blocks to cause said fruit to feed along the same.

11. In a fruit washer the combination with a rotary brush, of means for feeding fruit past said brush, in a step-by-step movement, said means comprising a plurality of blocks spaced apart, and having inclined faces thereon, means connected with alternate blocks for operating said blocks to cause said fruit to feed along the same, said means comprising a plate to which said blocks are fastened, and means for alternately raising and lowering said blocks.

12. In a fruit washing machine the combination with a rotary brush, of a conveyer for feeding fruit relatively to said rotary brush, said conveyer comprising a series of blocks spaced apart, a second series of blocks alternating therewith, separate means connecting said series, means for causing an alternate raising and lowering of the first series of blocks, comprising a pair of pivoted arms, extensions on said arms and fastened to said connecting means, a connecting link between said arms, and means for oscillating said link to rock said arms upon their pivots.

13. In a fruit washing machine the combination with a plurality of rotary brushes, of conveyers for feeding fruit, each conveyer comprising a series of longer blocks spaced apart upon a base plate, a series of relatively shorter blocks upon a second base plate and projecting upwardly into the spaces between said longer blocks, and means for causing an alternate raising and lowering of said shorter blocks, comprising a pivoted member, a pair of extensions upon said member, each extension carrying the base plate of the series of shorter blocks, means for oscillating said pivoted member about its pivot, thereby to cause a relative lowering and raising of said arms and a corresponding lowering and raising of said shorter blocks.

14. In a fruit washer the combination with a rotary brush, of a conveyer for said brush comprising a plurality of longer blocks, a plurality of shorter blocks, said blocks being so arranged as to present an alternate series of long and short blocks, means for vertically reciprocating said series of shorter blocks, means for vertically reciprocating said series of longer blocks, said longer block reciprocating means being so connected with said shorter block reciprocating means as to cause a difference in the rate of reciprocations of the series of blocks, whereby said series will reciprocate a greater speed than said longer series.

15. In a fruit washing machine the combination with a brush, of means for feeding fruit relative to said brush, said means comprising a series of blocks having faces inclined toward the discharge end of the machine, said blocks being spaced apart, a second series of blocks projecting upwardly in said spaces and similarly inclined, means for vertically reciprocating said first series of blocks, means for vertically reciprocating said second series of blocks whereby fruit retained by one series of blocks will be raised by the other series of blocks upon the upward stroke thereof, and said fruit will be caused to travel toward the discharge end of said machine upon the downward stroke by means of said inclined face.

16. In a fruit washing machine the combination with a brush, of means for feeding fruit relative to said brush, comprising a series of blocks having faces inclined toward the discharge end of the machine, said blocks being spaced apart, a second series of blocks projecting upwardly in said spaces and similarly inclined, means for vertically reciprocating said series whereby fruit retained by the blocks of one series will be raised by the blocks of the other series upon the upward stroke thereof, and said fruit will be caused to travel toward the discharge end of said machine upon the downward stroke of the second series by means of said inclined faces, the said fruit rolling along said inclined faces thereby to present the entire fruit surface to the action of the brush, means for supplying washing liquid to said brush, and means for receiving said fruit at the discharge end of the machine.

17. In a fruit washing machine, in combination, a cleaning device and means for feeding the fruit relatively thereto comprising alternately reciprocating supports having their upper surfaces inclined toward the discharge end.

In testimony whereof I affix my signature in presence of two witnesses.

EDWARD N. MAULL.

Witnesses:
H. L. GAY,
A. J. GAY.